United States Patent
Lu

(10) Patent No.: US 8,078,379 B2
(45) Date of Patent: Dec. 13, 2011

(54) TRAFFIC LIGHT PREDICTION SYSTEM

(76) Inventor: Guixian Lu, Pontiac, MI (US)

( * ) Notice: Subject to any disclaimer, the term of this patent is extended or adjusted under 35 U.S.C. 154(b) by 1449 days.

(21) Appl. No.: 11/522,477

(22) Filed: Sep. 18, 2006

(65) Prior Publication Data

US 2008/0071460 A1  Mar. 20, 2008

(51) Int. Cl.
*G08G 1/00* (2006.01)

(52) U.S. Cl. .......................... 701/93; 340/917

(58) Field of Classification Search ............... 701/93, 701/117, 119; 340/905–907, 917
See application file for complete search history.

(56) References Cited

U.S. PATENT DOCUMENTS

| | | | | |
|---|---|---|---|---|
| 5,091,726 A * | 2/1992 | Shyu | ................................ | 701/96 |
| 6,084,543 A * | 7/2000 | Iizuka | ..................... | 342/357.13 |
| 6,707,391 B1 * | 3/2004 | Monroe | ....................... | 340/901 |
| 7,274,306 B2 * | 9/2007 | Publicover | ..................... | 340/907 |
| 7,634,352 B2 * | 12/2009 | Soulchin et al. | ................ | 701/117 |

* cited by examiner

*Primary Examiner* — Dalena Tran

(57) ABSTRACT

A traffic system that helps a driver to save fuel by avoiding red light or by minimized fuel supply before stopping a red light. It predicts the colors of a traffic light and automatically control the speed of the vehicle. The system comprising three kinds of moving sections representing three future colors: green, yellow, and red. The moving sections are moving towards the traffic light. There is a microprocessor in each vehicle to receive messages from the traffic light in front and to calculate an optimal speed to the cruise control in the vehicle.

3 Claims, 2 Drawing Sheets

" A Traffic Light Prediction System"

Figure 1 of " A Traffic Light Prediction System"

A Traffic Light Prediction System

TRAFFIC LIGHT PREDICTION SYSTEM

BACKGROUND OF THE INVENTION

There are many traffic lights in a city. When a vehicle run into a red light, it must stop and wait until the light changes to green before it is allowed to go. Stopping wastes energy on fuel and causes more pollution. It wastes travel time also. That is why the hybrid vehicles are hot now, but hybrid vehicles are expensive. Hybrid vehicles lose energy in both conversion of kinetic energy to chemical energy and conversion of chemical energy to kinetic energy. Hybrid vehicles can not convert kinetic energy to chemical if the battery is fully charged. Hybrid vehicles do not save time.

PRIOR ART a. Berezovsky (U.S. Pat. No. 6,552,668) "Attachment to traffic light apparatus for visual indication of traffic light duration"
b. Seguin et al. (U.S. 2005/0102872) "Traffic-signaling system"
c. Berezovsky (U.S. Pat. No. 6,175,313) "Attachment to traffic light apparatus for visual indication of traffic light duration"
d. Safronov et al. (U.S. Pat. No. 6,310,562) "Method of indicating time remaining until traffic lights change"
e. Peorowicz et al. (U.S. Pat. No. 6,516,273) "Method and apparatus for determination and warning of potential violation of intersection traffic control devices"

OBJECTIVES OF THE INVENTION

The primary objective of the present invention is to save fuel for vehicles and travel time. Other objectives are to reduce pollution from vehicles, to maximize the usage of the streets, and to reduce traffic accidents and traffic jams.

DETAILED DESCRIPTION

Figure 1:
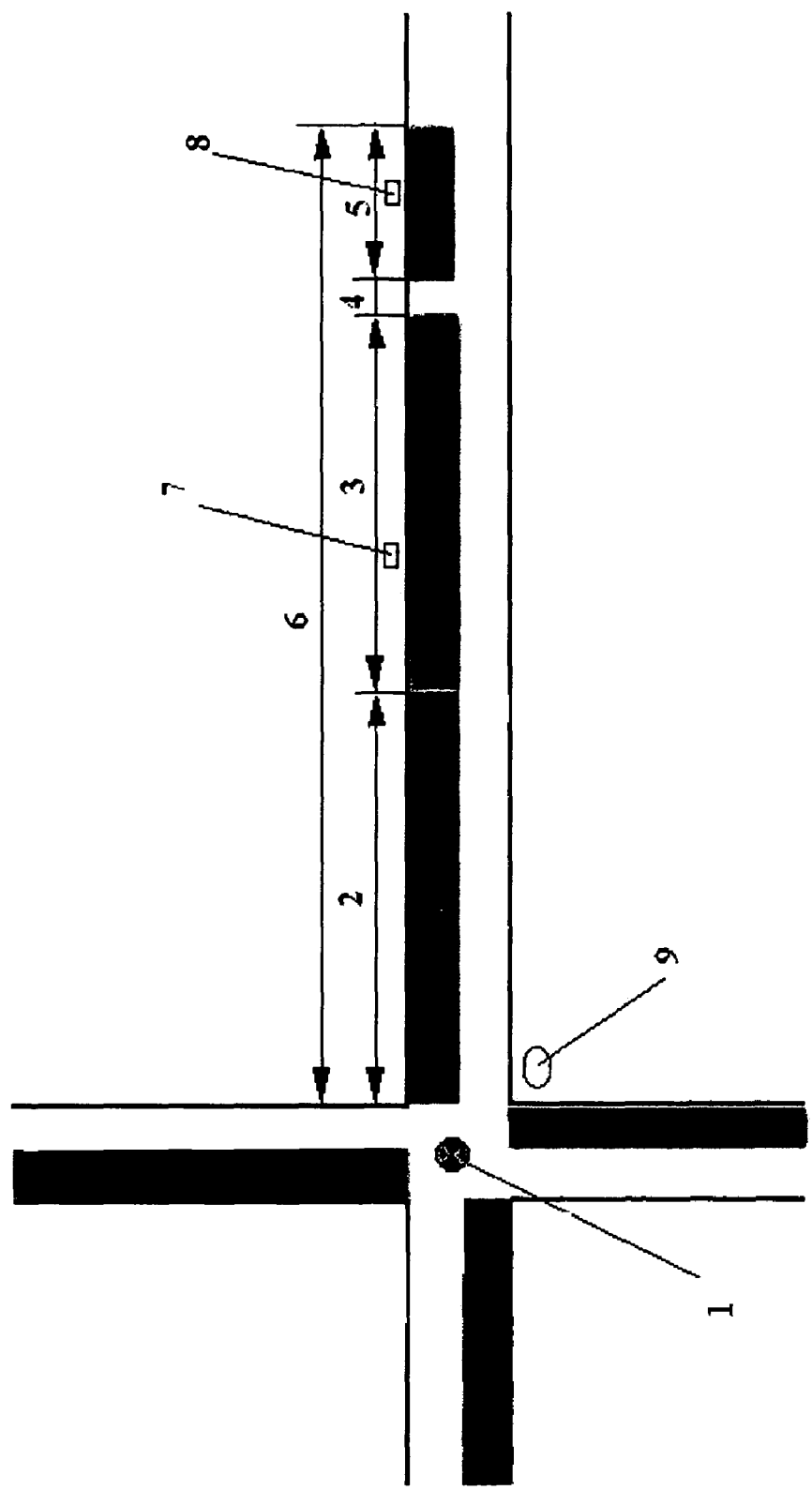
In FIG. 1: Item 1 is the traffic light. Item 2 is a red moving section. Item 3 is a green moving section. Item 4 is a yellow moving section. Item 5 is a red moving section. Item 6 is control zone that contains all the moving sections. Item 7 and 8 are communicators. Item 9 is a broadcast unit.
Figure 2:
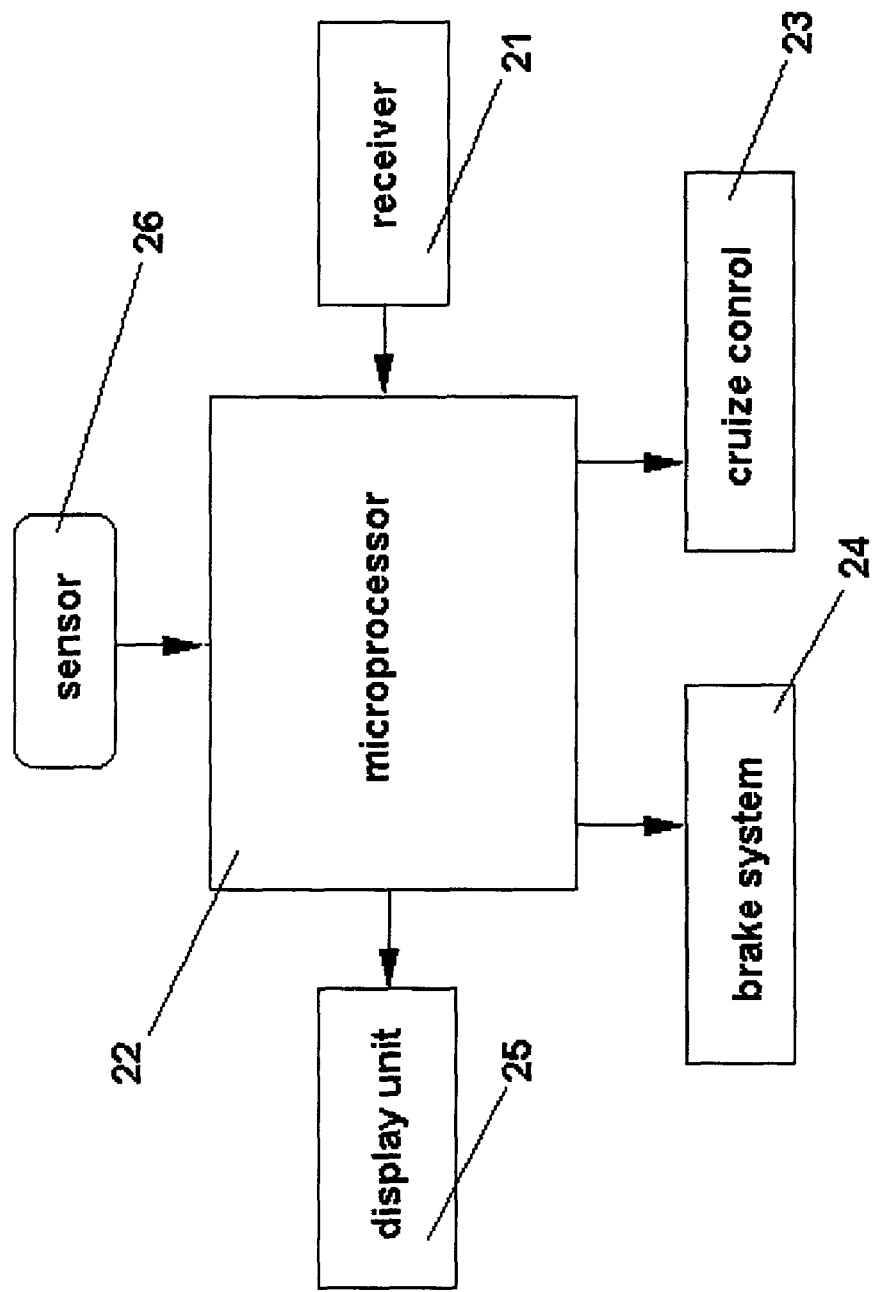
In FIG. 2: This figure shows all the parts of the system in the vehicle. Item 21 is a receiver. Item 22 is a microprocessor. Item 23 is cruise control. Item 24 is brake system. Item 25 is a display unit. Item 26 is a sensor.

The present invention artificially defines three kinds of moving section on streets before a traffic light: red sections, green sections, and yellow sections, representing three future colors of the traffic light. There is a control zone along the length of the traffic light, comprised of moving sections. Every moving section starts from the far end of the control zone, moving towards the traffic light, and ends at the traffic light. The length of the control zone (total length of moving sections) is fixed and is made long enough, if possible, to give vehicles long enough time to shift from a red section to a green section before they reach the traffic light. It is not necessary, though to make the control zone that long. Usually the speed of moving sections is defined as lower than the speed limit on the street. Length of every moving section increases from zero since it starts at the far end of the control zone. The full length of a moving section is approximately equal to speed of moving sections multiplied by the period of the color that the moving section represents. The movement of the moving sections is synchronized with the periods of the traffic light as follows: When a green section reaches the traffic light, it is about the time for the traffic light to change the color to green. When a yellow section reaches the traffic light, it is about the time for the traffic light to change the color to yellow. When a red section reaches the traffic light it is about the time for the traffic light to change the color to red. As the result of the synchronization, the moving section close to the traffic light always represents the same color as the traffic light.

There are seven strategies to control the vehicles:
1) If the vehicle is in a red section and close enough to shift to the green section in front before reaching the traffic light, it should shift to the front green section with a speed lower than speed limit.
2) Else if the vehicle is in a red section and has enough time to shift to the green section behind before reaches the traffic by minimizing the fuel supply, it should do so.
   The fact that there are fewer vehicles in red sections means less traffic jams, and less traffic accidents.
3) Else if the vehicle is in a red section and can reduce the speed by apply brake in order to shift to the green section without stopping at a future red light, it may do so when the total fuel consumption is less than other way (completely stop).
4) Else if the vehicle is in a red section and has to stop anyway, it should minimize the fuel supply without applying brakes.
5) If the vehicle is in a green section and there is no other vehicle in near front, it should move forwards to the front part of the green section with speed under speed limit to produce space in the rear part of the green section.
   The fact that vehicles concentrate to green sections means saving travel time and increase usage of streets.
6) If the vehicle is in a green section and there is another vehicle in front which is reducing speed and getting too close to the vehicle, the vehicle should reduce speed to keep a minimum distance between two vehicles.
7) If the vehicle is at the very front end of a green section, it should keep vehicle speed equal to speed of the moving sections so that the vehicle will stay at the front.

There may be a broadcast unit connected to the traffic light to collect the information about the phase of the traffic light color periods. It will broadcast the phase information to the vehicles, maybe include the periods of the colors, the speed limit, the speed of the moving sections, and the ID of the traffic light.

There is also a communicator(s). A communicator is connected to the traffic light and receives synchronizing signal from the traffic light. It sends out the information to vehicles about distance of the communicator to the traffic light. it maybe sending the information about the periods of colors, the phase, the speed limit, the speed of the moving sections, and the ID of the traffic light, if the broadcast unit does not cover some of the information. One of the ways for the communicator to do so is sending a infrared signal to the vehicle that passing by.

If the street is long, two communicators may be needed. The one that closer to the traffic light will send information to correct the calculation error of the microprocessor in the vehicle.

There may be a communicator on the other side of the street for the vehicles heading the other direction. The vehicle may accidentally receive a message sent by a communicator from the other side of street. In this case, the ID would be used for the vehicles to distinguish the messages from either side of the street. The message from a communicator on the other side of the street comes with ID for the traffic light at the back of the vehicle, which is the old ID that this vehicle received.

The receiver in the vehicle will receive the information from the broadcast unit and/or the communicator and send to the microprocessor.

The microprocessor is connected to a sensor for sensing a vehicle in front. The sensor will keep sending a message to the microprocessor about the distance from the vehicle in front of it.

The microprocessor runs the software program to calculate the positions of the traffic light, the moving sections, and the vehicle. The calculation will output optimal target speed to cruise control according to the strategies. The calculation may send a message to brake system to dictate a degree of braking.

If there are more than one communicator in one street for a traffic light, the microprocessor will have a chance to correct the calibration parameter for calculating speed of the vehicle. The parameter it will correct is the diameter of wheels. It will compare the actual distance between two communicator with the calculated distance to correct the parameter.

There will be a display unit in the vehicle to display the moving sections, the vehicle, and the traffic light.

What is claimed is:

1. A Traffic Light Prediction System that controls speed of vehicles to save fuel and promote safety by avoiding red lights or by decelerating before a red light comprising 1) at least a broadcast unit at a traffic light for broadcasting information about said traffic light,
2) communicators, positioned at varying distances along the street extending out from said traffic light, for receiving said information and for passing message by wireless to vehicles close to each of said communicators, wherein said message comprises distance of the communicator to the traffic light, color periods and color phase of said traffic light, speed limit, speed of moving section, and ID of said traffic light
3) receivers and microprocessors installed on vehicles for receiving and processing said message and said information and communicating with cruise controls of vehicle,
4) at least a distance sensor installed in front of a vehicle to sense distance from another vehicle in front.

2. A Traffic Light Prediction System in claim 1, wherein said information comprises color periods and color phase of said traffic light, speed limit, speed of moving sections, and ID of said traffic light.

3. A Traffic Light Prediction System in claim 1, wherein each of said microprocessors calculates future color of said traffic light according to said information, said message, and signals from said distance sensor to determine speed for cruise control of vehicle.

* * * * *